United States Patent
Chen

(10) Patent No.: US 10,421,690 B2
(45) Date of Patent: *Sep. 24, 2019

(54) COMPOSITES

(71) Applicant: National Tsing Hua University, Hsinchu (TW)

(72) Inventor: Swe-Kai Chen, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 665 days.

This patent is subject to a terminal disclaimer.

(21) Appl. No.: 15/159,110

(22) Filed: May 19, 2016

(65) Prior Publication Data

US 2017/0217839 A1 Aug. 3, 2017

(30) Foreign Application Priority Data

Jan. 29, 2016 (TW) .............................. 105102965 A

(51) Int. Cl.
| | |
|---|---|
| *C04B 35/58* | (2006.01) |
| *C04B 35/56* | (2006.01) |
| *C22C 29/02* | (2006.01) |
| *C22C 29/14* | (2006.01) |
| *C22C 1/05* | (2006.01) |
| *C22C 29/00* | (2006.01) |
| *C22C 32/00* | (2006.01) |

(52) U.S. Cl.
CPC .... *C04B 35/58071* (2013.01); *C04B 35/5607* (2013.01); *C04B 35/5611* (2013.01); *C04B 35/5622* (2013.01); *C04B 35/5626* (2013.01); *C04B 35/58064* (2013.01); *C04B 35/58078* (2013.01); *C22C 1/051* (2013.01); *C22C 29/005* (2013.01); *C22C 29/02* (2013.01); *C22C 29/14* (2013.01); *C22C 32/0047* (2013.01); *C04B 2235/3813* (2013.01); *C04B 2235/3839* (2013.01); *C04B 2235/3843* (2013.01); *C04B 2235/3847* (2013.01)

(58) Field of Classification Search
CPC . C22C 1/051; C22C 32/0052; C22C 32/0047; C22C 32/0068; C22C 29/005; C22C 29/02; C22C 29/14

See application file for complete search history.

(56) References Cited

U.S. PATENT DOCUMENTS

| | | | | |
|---|---|---|---|---|
| 3,964,878 A | * | 6/1976 | Scheithauer, Jr. | ...... C22C 29/06 428/546 |
| 7,354,548 B2 | * | 4/2008 | Liu | .......................... B22F 3/16 419/10 |
| 2012/0063943 A1 | * | 3/2012 | Kang | .................. C22C 32/0052 419/13 |

* cited by examiner

*Primary Examiner* — C Melissa Koslow

(74) *Attorney, Agent, or Firm* — Locke Lord LLP; Tim Tingkang Xia, Esq.

(57) ABSTRACT

A composite composed of two principal strengthening compounds and one principal cementing refractory metal that is prepared by combining a suitable binary to senary borides and/or carbides with a unitary to binary principal refractory metal is disclosed. As compared with the conventional sintered cemented carbides, the composite of the disclosure not only possess high hardness and high toughness but also has various ratios of principal components since it is not prepared with equal mole during the process.

1 Claim, 1 Drawing Sheet

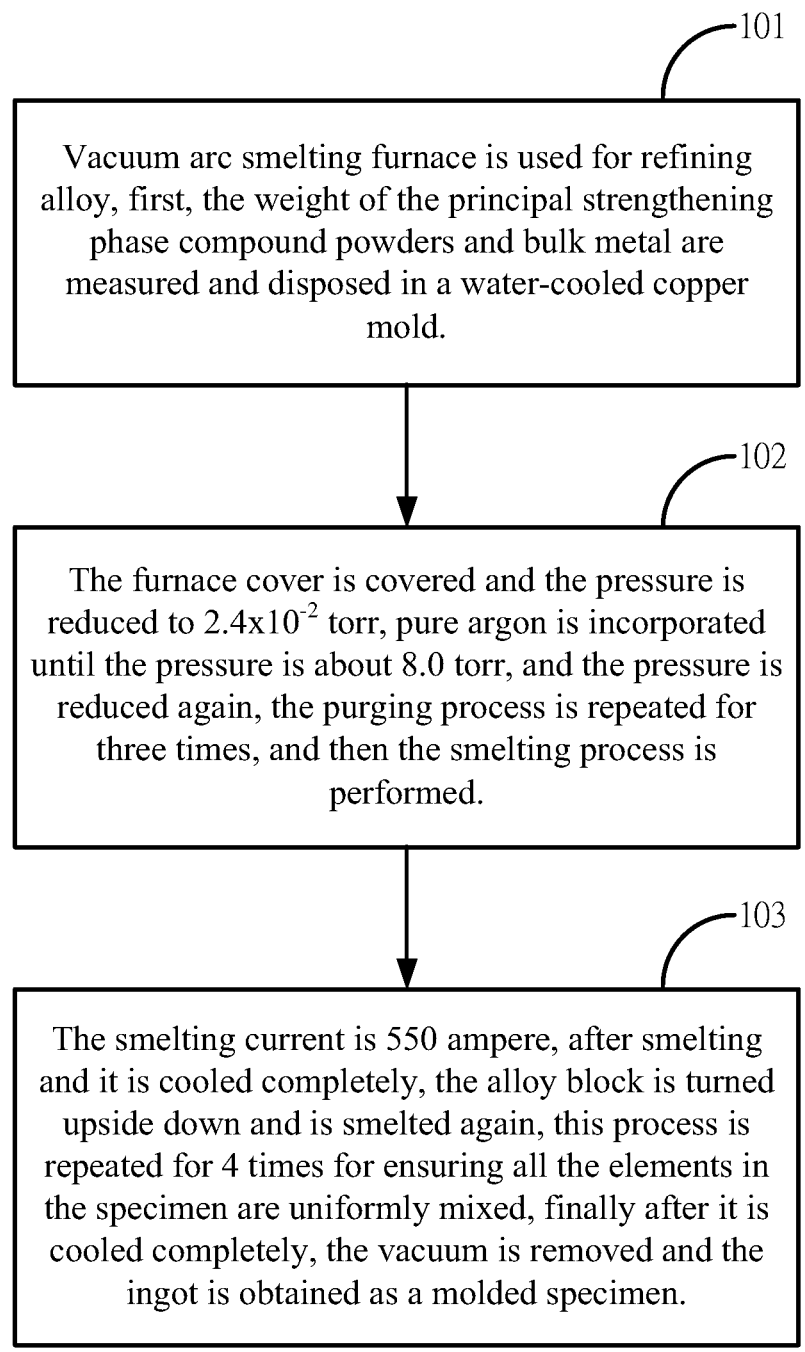

COMPOSITES

CROSS-REFERENCE TO RELATED APPLICATION

This application also claims priority to Taiwan Patent Application No. 105102965 filed in the Taiwan Patent Office on Jan. 29, 2016, the entire content of which is incorporated herein by reference.

BACKGROUND OF THE INVENTION

1. Field of the Invention

The disclosure is related to a composite having two of principal strengthening compounds and one principal cementing refractory metal, and is specifically related to zirconium diboride ($ZrB_2$) and one carbide combining with the principal cementing refractory metal to prepare a composite with superior hardness and toughness.

2. Descriptions of the Related Art

Conventional cemented carbides are a group of composites composed of WC and Co. In the early 1900s, Henri Moissan synthesized tungsten carbide (WC). Tungsten carbide is of a high hardness, and therefore could be even replacing diamonds in certain applications. However, the tungsten carbide is so brittle and porous that it is not suitable in engineering applications. In 1923, Schröter and Baumhauer found that after being sintered with cobalt or nickel, the tungsten carbide can maintain the hardness of ceramics at no expense of the toughness of metals. Thus, it is beneficial in mould industry. The material has been widely used in different units of cutting tools, mineral extraction and military weapons. About 60% of W consumption is used in producing cemented carbides. In 1930, the demand was 10 tons, and in 2008, it was 50,000 tons, increased by 5000 times in 78 years.

Cemented carbides are with two parts, one is a hardening and strengthening phase, and the other a cementing or binding phase. As described above, when WC is in the strengthening phase it has a high melting point and a high toughness as well as being good in wear resistance. Co in the cemented phase could contribute to a high electrical and thermal conductivity as well as to a high toughness so that the composite is not brittle. In recent studies, hard metals, such as WC and Co, are used as the basis and other carbides such as TiC, TaC and so forth are added to WC, while other binders such as Mo, Ni, Fe and so forth are added to Co, a group of composites, called cermets (ceramics-metals), could be developed. For traditional hard metals, including cermets, the main preparing process is sintering, also allowing for a minute amount of the cemented phase to be incorporated.

However, the composite prepared from the above could be with a variety of choices, and not all the composite having a high hardness and a high toughness can be prepared by using all of the strengthening phase and the cemented phase materials. Therefore, if some certain strengthening materials and some certain cemented materials could possibly result in a composite with a high hardness and a high toughness such a solution undoubtedly might advance the development of the corresponding technology.

SUMMARY OF THE INVENTION

The disclosure is related to a composite having two principal strengthening compounds and one principal refractory metal, and specifically, to a suitable combination of zirconium diboride ($ZrB_2$) and one carbide with one principal cementing refractory metal(s) to prepare a composite with high hardness and high toughness.

The composition of the disclosed composite is two principal strengthening compounds and one principal cementing refractory metal. One principal strengthening compound is zirconium diboride ($ZrB_2$). The other principal strengthening compound is selected from carbides. The mole fraction of the principal strengthening compounds and the mole fraction of the principal cementing refractory metal are different.

Specifically, the principal cementing refractory metal is W.

Specifically, the boride is $ZrB_2$.

Specifically, the carbide is selected from the group consisting of TiC, VC, ZrC, HfC, WC, NbC and TaC.

Specifically, the mole fraction of the total principal strengthening compounds is 60 mol %, and the mole fraction of the principal cementing refractory metal is 40 mol %.

BRIEF DESCRIPTION OF THE DRAWINGS

FIG. 1 is a flow chart of the process for preparing a composite having two principal strengthening compounds and one principal cementing refractory metal according to one embodiment of the disclosure.

DETAILED DESCRIPTION OF THE PREFERRED EMBODIMENTS

The following description with reference to the accompanying drawings is provided to clearly and completely explain the exemplary embodiments of the disclosure.

According to the disclosure, the feature is to select appropriate binary principal strengthening compounds (borides and/or carbides) and unitary principal cementing refractory metal so as to prepare a composite having a high hardness and a high toughness.

Although the product prepared by the sintering remains higher in hardness and strength under low temperatures, the process is too complicated and the toughness of the prepared product is not as desired. Thus, although it is feasible to prepare the principal strengthening compounds and the principal refractory metals by sintering, it is simpler and more rapid than sintering if they are prepared by the smelting process. In addition, the metallurgical microstructure of the product prepared by the smelting process is a typical dendritic structure, which has 100% relative density and is good in toughness. Therefore, the disclosure is explained by the embodiments employing the smelting process. However, a composite with a high hardness and a high toughness can still be prepared by the sintering if necessary according to the disclosure.

As shown in FIG. 1, when using the smelting process, the method may include the following:

(1) Vacuum arc smelting process furnace is used for preparing composite, the principal strengthening compound powders and bulk metal are weighted and placed evenly in a water-cooled copper mold (101);

(2) The furnace cover is covered and the pressure is reduced to $2.4 \times 10^{-2}$ torr, pure argon is incorporated until the pressure is about 8.0 torr, and the pressure is reduced again, the purging process is repeated for three times, and then the smelting process process is performed (102); and (3) The smelting process current is 550 ampere, after the smelting process and the composite is cooled completely, the composite block is turned upside down and is smelted again;

such flipping and smelting process may be repeated for 4 times for ensuring all the elements in the specimen are uniformly mixed; when the composite is cooled completely again, the vacuum may be exhausted and the ingot is obtained as a molded specimen (103).

According to the embodiment of the disclosure, the composite is with two principal strengthening compounds and a principal cementing refractory metal, and one principal strengthening compound is zirconium diboride ($ZrB_2$), the other principal strengthening compounds is selected from carbides. The mole fraction of the principal strengthening compounds and the mole fraction of the principal cementing refractory metal are different, the principal cementing refractory metal is W, and the carbide is selected from TiC, VC, ZrC, HfC, WC, NbC and TaC (Table 4).

According to the first comparative embodiment, Table 1, the used boride is $TiB_2$ (B1) and $ZrB_2$ (B2) and the used principal cementing refractory metal is Nb, Ta, Mo and W. According to the table, it is the composite combined by a unitary boride as the principal strengthening compound and a unitary principal cementing refractory metal. Further, Table 1 shows the hardness (HV) and the toughness ($K_{IC}$) of the composite composed of the unitary boride and the unitary principal cementing refractory metal.

TABLE 1

| Serial Number | Component | Hardness (HV) | Toughness ($K_{IC}$, MPa m$^{1/2}$) |
|---|---|---|---|
| B1Nb | $(TiB_2)_{0.6}Nb_{0.4}$ | 1826 ± 62 | 6.5 ± 0.2 |
| B1Ta | $(TiB_2)_{0.6}Ta_{0.4}$ | 1832 ± 21 | X |
| B1Mo | $(TiB_2)_{0.6}Mo_{0.4}$ | 1807 ± 22 | 9.1 ± 0.3 |
| B1W | $(TiB_2)_{0.6}W_{0.4}$ | 1900 ± 64 | 7.7 ± 0.8 |
| B2Nb | $(ZrB_2)_{0.6}Nb_{0.4}$ | 1683 ± 33 | 8.7 ± 0.3 |
| B2Ta | $(ZrB_2)_{0.6}Ta_{0.4}$ | 1608 ± 26 | 8.4 ± 0.5 |
| B2Mo | $(ZrB_2)_{0.6}Mo_{0.4}$ | 1578 ± 26 | 8.1 ± 0.3 |
| B2W | $(ZrB_2)_{0.6}W_{0.4}$ | 1267 ± 64 | 11.2 ± 0.7 |

According to the second comparative embodiment, Table 2, the used boride is $TiB_2$ (B1) and $ZrB_2$ (B2) and the used carbide is TiC (C1), VC (C2), ZrC (C3), HfC (C4), WC (C5), NbC (C6) and TaC (C7). The difference between W and W' is the mole fraction. According to the table, it is the composite combined by unitary boride as the principal strengthening compound and unitary or binary carbide as the principal strengthening compound. Further, Table 2 shows the hardness (HV) and the toughness ($K_{IC}$) of the composite having the unitary boride or the unitary or binary carbide as the principal strengthening compound and the unitary principal cementing refractory metal as the principal cementing refractory metal.

TABLE 2

| Serial Number | Component | Hardness (HV) | Toughness ($K_{IC}$, MPa m$^{1/2}$) |
|---|---|---|---|
| C2B1C3 | $(TiB_2)_{0.25}(VC)_{0.25}(ZrC)_{0.1}W_{0.4}$ | 2199 ± 32 | 7.5 ± 0.2 |
| C2B1C4 | $(TiB_2)_{0.25}(VC)_{0.25}(HfC)_{0.1}W_{0.4}$ | 2213 ± 80 | 8.1 ± 0.4 |
| C1B2C3 | $(ZrB_2)_{0.25}(TiC)_{0.25}(ZrC)_{0.1}W_{0.4}$ | 2055 ± 60 | 6.5 ± 0.4 |
| C1B2C3 | $(ZrB_2)_{0.25}(TiC)_{0.25}(HfC)_{0.1}W_{0.4}$ | 2130 ± 43 | 8.0 ± 0.4 |
| C1B1W' | $(TiB_2)_{0.2}(TiC)_{0.2}W_{0.6}$ | 1517 ± 22 | 11.3 ± 0.4 |
| C2B1W' | $(TiB_2)_{0.2}(VC)_{0.2}W_{0.6}$ | 1769 ± 33 | 10.5 ± 0.2 |
| C6B1W' | $(TiB_2)_{0.2}(ZrC)_{0.2}W_{0.6}$ | 1653 ± 34 | 8.6 ± 0.3 |
| C7B1W' | $(TiB_2)_{0.2}(TaC)_{0.2}W_{0.6}$ | 1698 ± 26 | 9.9 ± 0.1 |
| C1B2W' | $(ZrB_2)_{0.2}(TiC)_{0.2}W_{0.6}$ | 1744 ± 16 | 9.7 ± 0.1 |

According to the third comparative embodiment, Table 3, the boride is $TiB_2$ (B1) and the carbide is TiC (C1), VC (C2), ZrC (C3), HfC (C4), WC (C5), NbC (C6) and TaC (C7). According to the table, it is the composite combined by a unitary boride (the principal strengthening compound), a unitary carbide (the principal strengthening compound) and a unitary principal cementing refractory metal (the principal cementing refractory metal). Further, Table 3 shows the hardness (HV) and the toughness ($K_{IC}$) of the composite having the unitary boride (the principal strengthening compound), the unitary carbide (the principal strengthening compound) and the unitary principal cementing refractory metal (the principal cementing refractory metal).

TABLE 3

| Serial Number | Component | Hardness (HV) | Toughness ($K_{IC}$, MPa m$^{1/2}$) |
|---|---|---|---|
| C1B1 | $[(TiC)(TiB_2)]_{0.6}W_{0.4}$ | 1699 ± 64 | 7.7 ± 0.5 |
| C2B1 | $[(VC)(TiB_2)]_{0.6}W_{0.4}$ | 2323 ± 34 | 9.8 ± 0.3 |
| C3B1 | $[(ZrC)(TiB_2)]_{0.6}W_{0.4}$ | 1733 ± 71 | 8.6 ± 0.5 |
| C4B1 | $[(HfC)(TiB_2)]_{0.6}W_{0.4}$ | 1394 ± 58 | 10.5 ± 0.6 |
| C5B1 | $[(WC)(TiB_2)]_{0.6}W_{0.4}$ | 1463 ± 32 | 6.1 ± 0.6 |
| C6B1 | $[(NbC)(TiB_2)]_{0.6}W_{0.4}$ | 1897 ± 31 | 7.6 ± 0.4 |
| C7B1 | $[(TaC)(TiB_2)]_{0.6}W_{0.4}$ | 1935 ± 19 | 9.1 ± 0.4 |

According to the embodiment of the present invention, Table 4, the used boride is $ZrB_2$ (B2) and the used carbide is TiC (C1), VC (C2), ZrC (C3), HfC (C4), WC (C5), NbC (C6) and TaC (C7). According to the table, it is the composite combined by a unitary boride (the principal strengthening compound), a unitary carbide (the principal strengthening compound) and a unitary principal cementing refractory metal (the principal cementing refractory metal). Further, Table 4 shows the corresponding hardness (HV) and the toughness ($K_{IC}$) of the composite having the unitary boride (the principal strengthening compound), the unitary carbide (the principal strengthening compound) and the unitary principal cementing refractory metal (the principal cementing refractory metal).

TABLE 4

| Serial Number | Component | Hardness (HV) | Toughness ($K_{IC}$, MPa m$^{1/2}$) |
|---|---|---|---|
| C1B2 | $[(TiC)(ZrB_2)]_{0.6}W_{0.4}$ | 2195 ± 88 | 8.8 ± 0.6 |
| C2B2 | $[(VC)(ZrB_2)]_{0.6}W_{0.4}$ | 2265 ± 57 | 7.4 ± 0.4 |
| C3B2 | $[(ZrC)(ZrB_2)]_{0.6}W_{0.4}$ | 1394 ± 52 | 12.1 ± 0.6 |
| C4B2 | $[(HfC)(ZrB_2)]_{0.6}W_{0.4}$ | 1245 ± 69 | 12.4 ± 0.7 |
| C5B2 | $[(WC)(ZrB_2)]_{0.6}W_{0.4}$ | 2302 ± 92 | 7.3 ± 0.3 |
| C6B2 | $[(NbC)(ZrB_2)]_{0.6}W_{0.4}$ | 2275 ± 89 | 7.2 ± 0.6 |
| C7B2 | $[(TaC)(ZrB_2)]_{0.6}W_{0.4}$ | 2374 ± 66 | 6.8 ± 0.2 |

According to Tables 1 to 4, when diborides ($TiB_2$ and $ZrB_2$) are incorporated into the system, the mechanical properties of most of the specimens may improve. Moreover, in C1B2 to C7B2, all of the hardness of the specimens significantly improves.

According to the fourth to seventh comparative embodiments of the disclosure, the composite is composed of one to six principal strengthening compounds and the principal cementing refractory metal. The principal strengthening compounds may be selected from carbides, the principal cementing refractory metal may be selected from W. The mole fraction of the total principal strengthening compounds is 60 mol %, and the mole fraction of the principal cementing refractory metal is 40 mol %. In addition, the carbide is TiC, ZrC, HfC, VC, NbC, TaC and WC.

According to the fourth comparative embodiment, Table 5, the used carbide is TiC (T1~T9 is defined by the mole fraction) (the chemical formula is $(TiC)_{0.x}W_{(1-0.x)}$, x=1~9) and the used principal cementing refractory metal is W. According to the table, it is the composite combined by a unitary carbide (the principal strengthening compound) and a unitary W (the principal cementing refractory metal). Further, Table 5 shows the hardness (HV) and the toughness ($K_{IC}$) of the composite composed of the unitary carbide (the principal strengthening compound) and the unitary W (the principal cementing refractory metal). According to the table, W has better performance in both hardness and toughness when the mole fraction of W is 40 mol %. Therefore, the following embodiments are with 40 mole % of W for the illustration purpose.

TABLE 5

| Serial Number | Component | Hardness (HV) | Toughness ($K_{IC}$, MPa m$^{1/2}$) |
|---|---|---|---|
| WT1 | $(TiC)_{0.1}W_{0.9}$ | 691 ± 24 | — |
| WT2 | $(TiC)_{0.2}W_{0.8}$ | 956 ± 32 | — |
| WT3 | $(TiC)_{0.3}W_{0.7}$ | 1159 ± 27 | 16.2 ± 1.1 |
| WT4 | $(TiC)_{0.4}W_{0.6}$ | 1252 ± 33 | 11.8 ± 0.7 |
| WT5 | $(TiC)_{0.5}W_{0.5}$ | 1461 ± 66 | 8.6 ± 0.4 |
| WT6 | $(TiC)_{0.6}W_{0.4}$ | 1820 ± 57 | 7.2 ± 0.4 |
| WT7 | $(TiC)_{0.7}W_{0.3}$ | 2367 ± 110 | 3.8 ± 0.8 |
| WT8 | $(TiC)_{0.8}W_{0.2}$ | 2557 ± 96 | — |
| WT9 | $(TiC)_{0.9}W_{0.1}$ | 2770 ± 22 | — |

According to the fifth comparative embodiment, Table 6, the carbide is TiC (C1), VC (C2), ZrC (C3), HfC (C4), WC (C5), NbC (C6) and TaC (C7), and S indicates W with 40 mole %. According to the table, it is the composite combined by a unitary carbide (the principal strengthening compound) and a unitary W (the principal cementing refractory metal). Further, Table 6 shows the hardness (HV) and the toughness ($K_{IC}$) of the composite composed of the unitary carbide (the principal strengthening compound) and the unitary W (the principal cementing refractory metal).

TABLE 6

| Serial Number | Component | Hardness (HV) | Toughness ($K_{IC}$, MPa m$^{1/2}$) |
|---|---|---|---|
| SC1 | $(TiC)_{0.6}W_{0.4}$ | 1820 ± 57 | 7.24 ± 0.41 |
| SC2 | $(ZrC)_{0.6}W_{0.4}$ | 1156 ± 7 | 12.40 ± 0.54 |
| SC3 | $(HfC)_{0.6}W_{0.4}$ | 1279 ± 21 | 11.22 ± 0.63 |
| SC4 | $(VC)_{0.6}W_{0.4}$ | 1675 ± 61 | 4.13 ± 0.26 |

TABLE 6-continued

| Serial Number | Component | Hardness (HV) | Toughness ($K_{IC}$, MPa m$^{1/2}$) |
|---|---|---|---|
| SC5 | $(NbC)_{0.6}W_{0.4}$ | 1837 ± 33 | 7.07 ± 0.20 |
| SC6 | $(TaC)_{0.6}W_{0.4}$ | 1980 ± 33 | 6.82 ± 0.12 |
| SC7 | $(WC)_{0.6}W_{0.4}$ | 2057 ± 60 | 6.16 ± 0.18 |

According to the sixth comparative embodiments, Table 7, NT1 indicates that the used carbide is NbC and TaC, NT2 indicates that the used carbide is NbC, TaC and TiC. NT2a, NT2b, NT2c and NT2d may have different mole ratios of the used carbide compared to NT2. In the meantime, NT2e indicates that the used carbide is TiC, ZrC, HfC, NbC and TaC, NT3 indicates that the used carbide is NbC, TaC, TiC and WC. Similarly, NT3a and NT3b may have different mole ratios of the used carbide compared with NT3. Also, NT4 indicates that the used carbide is NbC, TaC, TiC, WC and VC, and NT5 indicates that the used carbide is NbC, TaC and WC. According to the table, it is the composite combined by a binary or more of carbide (the principal strengthening compound) and a unitary W (the principal cementing refractory metal). Further, Table 7 shows the hardness (HV) and the toughness ($K_{IC}$) of the composite composed of the binary or more of carbide (the principal strengthening compound) and the unitary W (the principal cementing refractory metal).

TABLE 7

| Serial Number | Component | Hardness (HV) | Toughness ($K_{IC}$, MPa m$^{1/2}$) |
|---|---|---|---|
| NT1 | $[(NbC)(TaC)]_{0.6}W_{0.4}$ | 2105 ± 48 | 6.7 ± 0.4 |
| NT2 | $[(TiC)(NbC)(TaC)]_{0.6}W_{0.4}$ | 2045 ± 81 | 7.7 ± 0.6 |
| NT2a | $(TiC)_{0.24}(NbC)_{0.18}(TaC)_{0.18}W_{0.4}$ | 1981 ± 38 | 7.6 ± 0.5 |
| NT2b | $(TiC)_{0.16}(NbC)_{0.22}(TaC)_{0.22}W_{0.4}$ | 2096 ± 29 | 7.0 ± 0.4 |
| NT2c | $\{(TiC)_2(NbC)(TaC)\}_{0.6}W_{0.4}$ | 1911 ± 70 | 7.3 ± 0.4 |
| NT2d | $[(ZrC)(NbC)(TaC)]_{0.6}W_{0.4}$ | 1459 ± 74 | 7.6 ± 0.4 |
| NT2e | $(TiC)_{0.12}(ZrC)_{0.04}(HfC)_{0.04}(NbC)_{0.2}(TaC)_{0.2}W_{0.4}$ | 1544 ± 44 | 8.1 ± 0.2 |
| NT3 | $[(TiC)(NbC)(TaC)(WC)]_{0.6}W_{0.4}$ | 2073 ± 66 | 7.9 ± 0.6 |
| NT3a | $\{(TiC)_2(NbC)(TaC)\}_{0.6}W_{0.4}$ | 2165 ± 67 | 8.4 ± 0.3 |
| NT3b | $\{(TiC)(NbC)(TaC)(WC)_{0.5}\}_{0.6}W_{0.4}$ | 2120 ± 89 | 7.9 ± 0.2 |
| NT4 | $[(TiC)(NbC)(TaC)(WC)(VC)]_{0.6}W_{0.4}$ | 2150 ± 39 | 6.0 ± 0.3 |
| NT5 | $[(NbC)(TaC)(WC)]_{0.6}W_{0.4}$ | 2118 ± 108 | 6.3 ± 0.4 |

According to the seventh comparative embodiments, Table 8, WC 1 indicates that the used carbide is TiC and WC, WC2 indicates that the used carbide is TiC, ZrC, HfC and WC, HE1 indicates that the used carbide is TiC, ZrC, HfC, NbC, TaC and WC, HE2 indicates that the used carbide is TiC, ZrC, HfC, VC, NbC, TaC and WC, HE3 has different mole ratio of the used carbide, as compared with HE2, MW1 indicates that the used carbide is TiC, NbC and TaC, MW2 indicates that the used carbide is TiC, NbC, TaC, WC, MW3 and MW4 have different mole ratio of the used carbide, as compared with MW2, MW5 indicates that the used carbide is NbC, and MW 6 indicates that the used carbide is TaC. According to the table, it is the composite combined by a unitary or more of carbide (the principal strengthening compound) and a unitary W (the principal cementing refractory metal). Further, Table 8 shows the hardness (HV) and the toughness ($K_{IC}$) of the composite composed of the unitary or more of carbide (the principal strengthening compound) and the unitary W (the principal cementing refractory metal).

TABLE 8

| Serial Number | Component | Hardness (HV) | Toughness ($K_{IC}$, MPa m$^{1/2}$) |
|---|---|---|---|
| WC1 | $(TiC)_{0.5}(WC)_{0.1}W_{0.4}$ | 1873 ± 24 | 7.7 ± 0.3 |
| WC2 | $[(TiC)(ZrC)(HfC)]_{0.5}(WC)_{0.1}W_{0.4}$ | 1260 ± 23 | 10.9 ± 0.7 |
| HE1 | $[(TiC)(ZrC)(HfC)(NbC)_2(TaC)_2(WC)]_{0.6}W_{0.4}$ | 1601 ± 92 | 7.1 ± 0.4 |
| HE2 | $[(TiC)(ZrC)(HfC)(VC)(NbC)_2(TaC)_2(WC)]_{0.6}W_{0.4}$ | 1742 ± 47 | 8.4 ± 0.5 |
| HE3 | $[(TiC)(ZrC)(VC(NbC)_2(TaC)_2(WC)]_{0.6}W_{0.4}$ | 1960 ± 29 | 6.9 ± 0.2 |
| MW1 | $[(TiC)(NbC)(TaC)]_{0.4}W_{0.6}$ | 1423 ± 68 | 10.3 ± 0.8 |
| MW2 | $[(TiC)(NbC)(TaC)(WC)]_{0.4}W_{0.6}$ | 1587 ± 29 | 9.3 ± 0.9 |
| MW3 | $\{(TiC)_2(NbC)(TaC)(WC)\}_{0.4}W_{0.6}$ | 1468 ± 36 | 11.1 ± 0.8 |
| MW4 | $\{(TiC)(NbC)(TaC)(WC)_{0.5}\}_{0.4}W_{0.6}$ | 1490 ± 82 | 11.3 ± 0.7 |
| MW5 | $(NbC)_{0.4}W_{0.6}$ | 1585 ± 33 | 7.8 ± 0.8 |
| MW6 | $(TaC)_{0.4}W_{0.6}$ | 1602 ± 30 | 8.0 ± 0.7 |

According to Tables 5 to 8, NT3a and NT3b have the best performance in both hardness and toughness. The two specimens have great performance in rear and cutting resistance. In addition, most of the composite in the disclosure may be with hardness greater than 1000 HV. Thus, the disclosure is significantly better than most of the commercial ultra hard alloy.

According to the disclosure, as compared to traditional technologies, the composite composed of two principal strengthening compounds and one principal cementing refractory metal of the disclosure has the following advantages:

1. The disclosure can select appropriate binary principal strengthening compounds and unitary principal cementing refractory metal so as to prepare a composite having a high hardness and a high toughness.

2. As compared to traditional cermet composites, the composite of the disclosure has a high hardness and a high toughness, and it is not prepared with equal mole during the process Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A composite, consisting of two principal strengthening compounds and one principal cementing refractory metal, wherein one principal strengthening compound is zirconium diboride ($ZrB_2$), the other principal strengthening compound is selected from the group consisting of TiC, VC, ZrC, HfC, WC, NbC and TaC, and the principal cementing refractory metal is tungsten (W), and the mole fraction of a total of the two principal strengthening phase compounds is 60 mol %, and the mole fraction of the principal cementing refractory metal is 40 mol %.

* * * * *